(12) United States Patent
Colunas et al.

(10) Patent No.: US 11,960,791 B2
(45) Date of Patent: Apr. 16, 2024

(54) CONTROL OF A MOTION TRACKING SYSTEM BY USER THEREOF

(71) Applicant: SWORD HEALTH S.A., Oporto (PT)

(72) Inventors: Márcio Filipe Moutinho Colunas, Oporto (PT); José Carlos Coelho Alves, Oporto (PT); Luís António Correia de Oliveira, Oporto (PT); Luís Ungaro Pinto Coelho, Oporto (PT); Virgílio António Ferro Bento, Oporto (PT)

(73) Assignee: SWORD HEALTH, S.A., Oporto (PT)

( * ) Notice: Subject to any disclaimer, the term of this patent is extended or adjusted under 35 U.S.C. 154(b) by 65 days.

(21) Appl. No.: 17/607,971

(22) PCT Filed: Oct. 29, 2020

(86) PCT No.: PCT/EP2020/080412
§ 371 (c)(1),
(2) Date: Nov. 1, 2021

(87) PCT Pub. No.: WO2021/089407
PCT Pub. Date: May 14, 2021

(65) Prior Publication Data
US 2022/0308829 A1 Sep. 29, 2022

(30) Foreign Application Priority Data
Nov. 4, 2019 (EP) .................................... 19398014

(51) Int. Cl.
*G06F 3/16* (2006.01)
*G06F 3/01* (2006.01)
(52) U.S. Cl.
CPC .............. *G06F 3/167* (2013.01); *G06F 3/011* (2013.01); *G06F 2218/00* (2023.01)

(58) Field of Classification Search
CPC ....... G06F 3/167; G06F 3/011; G06F 2218/00
See application file for complete search history.

(56) References Cited

U.S. PATENT DOCUMENTS 10,096,328 B1 * 10/2018 Markovich-Golan .......................
G10L 21/0216
10,702,190 B2 * 7/2020 Jo .......................... A61B 5/742
(Continued)

FOREIGN PATENT DOCUMENTS

WO WO-2019243438 A1 12/2019
WO WO-2021089407 A1 5/2021

OTHER PUBLICATIONS

International Search Report dated Jan. 21, 2021 re: Application No. PCT/EP2020/080412, pp. 1-3, US 2018/0126241 A1 and US 2013/0304479 A1.
(Continued)

*Primary Examiner* — Brian L Albertalli
(74) *Attorney, Agent, or Firm* — SCHWEGMAN LUNDBERG & WOESSNER, P.A.

(57) ABSTRACT

A method for controlling a motion tracking system, including the steps of: digitally processing sound waves detected by a plurality of microphones so as to detect a voice of a user and estimate a first direction of the user; digitally processing electromagnetic waves captured by antennas so as to detect data packets transmitted to a computing apparatus by sensors and estimate second directions of each sensor; digitally averaging the second directions so as to provide an average direction for the sensors; digitally computing a difference between the first direction and the average direction; and starting to digitally track motion of the user based on measurements of each sensor when the computed difference does not exceed a predetermined difference threshold.

20 Claims, 4 Drawing Sheets

(56) References Cited

U.S. PATENT DOCUMENTS

| | | | |
|---|---|---|---|
| 2006/0239471 A1* | 10/2006 | Mao | H04R 29/005 |
| | | | 381/92 |
| 2008/0096657 A1* | 4/2008 | Benoist | A63F 13/837 |
| | | | 463/36 |
| 2013/0304479 A1 | 11/2013 | Teller et al. | |
| 2017/0296873 A1* | 10/2017 | Kitamura | H04Q 9/00 |
| 2018/0047393 A1* | 2/2018 | Tian | G10L 17/06 |
| 2018/0126241 A1 | 5/2018 | Hung et al. | |
| 2020/0184963 A1* | 6/2020 | Joseph | G10L 15/22 |

OTHER PUBLICATIONS

Written Opinion dated Jan. 21, 2021 re: Application No. PCT/EP2020/080412, pp. 1-5, US 2018/0126241 A1 and US 2013/0304479 A1.

\* cited by examiner

CONTROL OF A MOTION TRACKING SYSTEM BY USER THEREOF

TECHNICAL FIELD

The present invention relates to the technical field of motion tracking systems. More particularly, the present invention relates to the control of a motion tracking procedure by the user of the motion tracking system.

STATE OF THE ART

Motion tracking or motion capture of a target is a technical process used in many applications, such as, control of machines, automatization of processes, or gait analysis to name a few. The motion of a person or an object can be tracked by means of sensors that are attached to the person or object.

In some applications in which the motion of a person is tracked, it is important that the person is able to control the motion tracking system for correct operation thereof. The person starts the motion tracking procedure, pauses it, resumes it, stops it, triggers a calibration routine whereby the sensors of the motion tracking systems are to be calibrated or recalibrated, etc.

Further, the motion sequence provided by a computing apparatus of the motion tracking system is processed in accordance with the concerned application. For instance, personal physical exercise and physical rehabilitation are applications that may rely on motion tracking and which are becoming more and more popular. As disclosed in international application no. PCT/EP2019/066237, a person may train or do physical therapy at some premises (e.g. at home, at a clinic) without the direct supervision of a trainer or a therapist, for example, yet the user is able to review her/his own physical exercises or provide information about the same to the trainer or the therapist, thanks to motion tracking. In such application, the person may also control the operation of the motion tracking system such that the physical exercises are started, paused, skipped, the difficulty thereof adjusted, etc.

Since in these cases the user is at a distance from the computing apparatus managing the operation of the motion tracking procedure so that she/he has sufficient room for doing the physical exercises, it would be desirable that the user of the motion tracking system is able to control the motion tracking procedure without having to use user input means. It would be also desirable that only the user of the motion tracking system is able to control the procedure so that other people within the premises do not affect the operation of the motion tracking system.

DESCRIPTION OF THE INVENTION

A first aspect of the invention relates to a method for controlling a motion tracking system, the motion tracking system comprising a plurality of sensors adapted for arrangement on a body of a user and configured to wirelessly transmit data packets, and a computing apparatus comprising both a plurality of antennas and a plurality of microphones, the method comprising:

digitally processing, with the computing apparatus, sound waves detected by each microphone so as to detect a voice of the user and estimate a first direction of the user relative to the computing apparatus based on the detected sound waves;

digitally processing, with the computing apparatus, electromagnetic waves captured by each antenna so as to detect data packets transmitted to the computing apparatus by each sensor of the plurality of sensors and estimate second directions of each sensor relative to the computing apparatus based on the captured electromagnetic waves, each data packet including one or more measurements of a respective sensor;

digitally averaging the second directions with the computing apparatus so as to provide an average direction for the plurality of sensors;

digitally computing a difference between the first direction and the average direction with the computing apparatus; and starting, the computing apparatus, to digitally track motion of the user based on measurements of each sensor in the data packets when the computed difference does not exceed a predetermined difference threshold.

The user is able to control the operation of the motion tracking system and, in this sense, the system starts to track the motion of the user when the computing apparatus considers that the user of the motion tracking system is commanding the motion tracking system to track the motion. To this end, the computing apparatus awaits the detection of voice of the user, who may pronounce anything but preferably a voice command, and then the computing apparatus determines whether the voice is from the user of the motion tracking system. The computing apparatus positively determines so when the voice and the electromagnetic waves arrive at the computing apparatus from the same direction or a similar direction; how similar the directions must be depends on the value of the predetermined difference threshold. The user of the motion tracking system uses the system whenever she/he is wearing some or all sensors, and in that case the voice detected by the microphones and the electromagnetic waves captured by the antennas arrive from a same or similar direction.

Owing to the plurality of microphones, the computing apparatus is capable of computing a direction of arrival of the detected voice due to the differences of the same pressure wave when received at the different antennas; the computed direction of arrival establishes the first direction, which is an estimation of where the user is relative to the computing apparatus. And owing to the plurality of antennas, the computing apparatus is capable of computing a direction of arrival of the captured electromagnetic waves due to the differences of the same electromagnetic wave when received at the different antennas; the computed direction of arrival establishes the second direction, which is an estimation of where the sensor that radiated a given electromagnetic wave is relative to the computing apparatus. The sensors radiate electromagnetic waves whenever they transmit data packets to the computing apparatus, something that may start as soon as each sensor establishes communications with the computing apparatus, for example upon pairing the sensor with the computing apparatus for wireless data transmissions between the two devices. Each sensor is to establish wireless communications with the computing apparatus, and measurements of the sensors are provided to the computing apparatus in data packets.

Since there is a plurality of sensors, the average direction is computed as the average of all the second directions (there are as many second directions as sensors are), in this way when the user is arranging the different sensors on her/his body, the sensors not yet arranged on the body may be on a table or on a storage device or station where the sensors are placed while not being in use. In some cases, this may avoid a false positive as the second directions of the sensors arranged on the body may substantially differ (something that ultimately depends on the predetermined difference threshold set) from the second directions of the sensors not arranged on the body.

The first direction, second directions and average direction may be defined, for example, as angles defined with respect to a horizontal plane (i.e. the angles are not indicative of the vertical direction, they are only indicative of the horizontal direction) and relative to the computing apparatus (i.e. the horizontal plane contains at least part of the computing apparatus), or as two-dimensional vectors representing said angles; they may also be defined as three-dimensional angles or three-dimensional vectors (that are indicative of the vertical direction too) relative to the computing apparatus, or in other forms known in the art as well.

The computing apparatus digitally compares the first direction with the average direction so as to compute a difference between the two, and when said difference is less than or equal to the predetermined difference threshold (e.g. 20 degrees, 25 degrees, 30 degrees, etc.), it starts to digitally track motion of the user by digitally processing the measurements of the sensors so as to digitally provide a motion sequence of the user, and said motion sequence may then be digitally processed by the computing apparatus for physical exercise evaluation, for instance as described in commonly owned international application no. PCT/EP2019/066237, incorporated by reference in its entirety herein. Accordingly, the user may trigger the start of the motion tracking procedure with her/his voice.

In some embodiments, starting to digitally track motion of the user is carried out when both the computed difference does not exceed the predetermined difference threshold and the computing apparatus determines that the detected voice comprises a voice command for tracking motion of the user.

The user is able to operate the motion tracking system by way of voice commands. In this sense, the computing apparatus needs not only to detect the voice of the user such that the difference between the first direction and the average direction does not exceed the predetermined difference threshold, but also that the detected voice corresponds to a voice command associated with starting the motion tracking such as, for example, 'start', 'begin', 'resume', etc.

In some embodiments, upon detecting the voice of the user by digitally processing the detected sound waves, the computing apparatus determines whether the detected voice belongs to a predetermined user by digitally comparing the detected voice with a voice sample of the predetermined user stored in the computing apparatus, and the first direction is estimated when the computing apparatus has determined that the detected voice belongs to the predetermined user.

In some embodiments, upon detecting the voice of the user by digitally processing the detected sound waves, the computing apparatus determines whether one voice detected therefrom belongs to a predetermined user by digitally comparing the detected voice with a voice sample of the predetermined user stored in the computing apparatus, and the first direction is an estimation of the direction of the user of the one voice detected, relative to the computing apparatus, when the computing apparatus has determined that the one voice detected belongs to the predetermined user.

The computing apparatus further determines whether the detected voice belongs to the user of the motion tracking system by comparing the detected voice with a voice sample of the user that is digitally stored in the computing apparatus. To this end, the computing apparatus may store a voice (as a voice sample) that was detected at a previous time when the difference computed did not exceed the predetermined difference threshold, so during operation of the motion tracking system by the user; additionally or alternatively, the intended users of the motion tracking system may provide a voice sample before using the system, for instance as part of a configuration routine whereby the data of the users are introduced.

Upon determining that the detected voice belongs to the user, the computing apparatus estimates her/his direction by means of the detected sound waves thereby providing the first direction.

When a plurality of voices is detected, the computing apparatus compares each detected voice with the voice sample of the predetermined user and determines whether any one of the voices belongs to said user. Upon determining that the detected voice belongs to the user, the computing apparatus estimates her/his direction by means of the detected sound waves thereby providing the first direction. To this end, the computing apparatus processes the sound waves that correspond to the detected voice belonging to the user. The voice recognition is useful for identifying the user of the motion tracking system when two or more people speak at the same time, and the respective resulting computed differences do not exceed the predetermined difference threshold.

The comparison of the detected voice with the voice sample may be carried out in any way known in the art, for instance by means of acoustic fingerprinting, frequency spectra comparison, voice sampling, etc. One or more predetermined thresholds are set so as to determine that the detected voice belongs to the predetermined user in spite of not having an exact match.

In some embodiments, the method further comprises: digitally storing, in the computing apparatus, a voice sample of the user prior to the estimation of the first direction.

In some embodiments, starting to digitally track motion of the user when the computed difference does not exceed the predetermined difference threshold further comprises: digitally storing, in the computing apparatus, the detected voice as a voice sample of the user.

In some embodiments, the first direction is estimated by phase differencing the sound waves detected by each microphone, and/or the second directions are estimated by phase differencing the electromagnetic waves captured by each antenna of the computing apparatus.

Either one of the first direction and the second directions, or even both the first direction and the second directions are computed by the computing apparatus by evaluating the phase differences between the detected sound waves at the different microphones, and/or the phase differences between the captured electromagnetic waves at the different antennas. As it is known in the art, the phase of the sound waves and/or the phase of the electromagnetic waves makes possible to determine a direction of arrival when there is a plurality of microphones and/or a plurality of antennas, respectively.

In some embodiments, the first direction is estimated by measuring time difference of arrival of the sound waves detected by each microphone, and/or the second directions are estimated by measuring time difference of arrival of the electromagnetic waves captured by each antenna of the computing apparatus.

Either one of the first direction and the second directions, or even both the first direction and the second directions are computed by the computing apparatus by measuring time differences of arrival of the detected sound waves at the different microphones, and/or the time differences of arrival of the captured electromagnetic waves at the different antennas. As it is known in the art, the moment of reception of the sound waves and/or the moment of reception of the electromagnetic waves makes possible to determine a direction of arrival when there is a plurality of microphones and/or a plurality of antennas, respectively.

In some embodiments, the method further comprises not starting, the computing apparatus, to digitally process measurements of each sensor in the data packets so as not to track motion of the user when the computed difference exceeds the predetermined difference threshold.

When the computed difference is greater than the predetermined difference threshold, the computing apparatus considers that whoever spoke is not the user of the motion tracking system or, alternatively, that whoever spoke may actually be the intended user of the motion tracking system yet she/he has not arranged the sensors on her/his body. The computing apparatus does not start to track motion when motion was not being tracked yet. If motion was already being tracked due to a previous detected voice that resulted in a computed difference not exceeding the predetermined difference threshold, the computing apparatus continues with the motion tracking.

In some embodiments, the method further comprises digitally providing or commanding provision of at least one perceptible signal when the computed difference exceeds the predetermined difference threshold, the at least one perceptible signal being indicative of at least one of:
  detection of not all sensors of the plurality of sensors being arranged on the body of the user; and
  indication that all the sensors of the plurality of sensors must be arranged on the body of the user.

When the computed difference is greater than the predetermined difference threshold, the computing apparatus considers that whoever spoke is not the user of the motion tracking system or, alternatively, that whoever spoke may actually be the intended user of the motion tracking system yet she/he has not arranged the sensors on her/his body. In case it is the latter situation the one taking place, the provided perceptible signal(s) is/are intended to inform the user that the computing apparatus does not detect the sensors as being on the body of the user and, thus, the motion tracking procedure is not active yet.

In some embodiments, the method further comprises digitally providing or commanding provision of the at least one perceptible signal when one or more computed differences between the first direction and the second direction of a sensor exceeds the predetermined difference threshold.

In some embodiments, the method further comprises digitally changing operation of the motion tracking system with the computing apparatus when both the computed difference does not exceed the predetermined difference threshold and the computing apparatus determines that the detected voice comprises a voice command for changing the operation.

The user operates the motion tracking system whenever she/he pronounces given voice commands and the computed difference resulting from each voice command is less than or equal to the predetermined difference threshold. By way of example, the voice commands may be associated with pausing the motion tracking, resuming the motion tracking, stopping the motion tracking, changing a physical exercise to be performed by the user, triggering a calibrating procedure, etc.

In some embodiments, the average direction is computed during a time interval that spans between a predetermined minimum averaging time and a predetermined maximum averaging time.

The computing apparatus captures many electromagnetic waves from the sensors while the same transmit data packets. By way of these electromagnetic waves, the computing apparatus estimates the second directions and computes the average direction during the time interval so that the resulting directions are more accurate. By way of example, the predetermined minimum averaging time is e.g. 5 milliseconds, 10 milliseconds, etc., and the predetermined maximum averaging time is e.g. 50 milliseconds, 100 milliseconds, 200 milliseconds, etc.

In some embodiments, the first direction is estimated when the voice has been detected during a time interval that spans between a predetermined minimum sound time and a predetermined maximum sound time.

In order to reduce false positives, the computing apparatus awaits a detection of voice lasting the time interval, meaning that the detected voice, in the time domain, has a duration spanning between the predetermined minimum sound time and the predetermined maximum sound time. Since the detected voice may correspond to several words, it is not necessary that the detected voice is continuous. In this sense, the computing apparatus digitally checks that there is detected voice during a percentage of the time period, for example during e.g. 75%, 80%, 85% or more of the time period. The predetermined minimum sound time and predetermined maximum sound time are preferably established in accordance with the sampling rate of the voice, and may be, for example but without limitation, 10 milliseconds and 100 milliseconds, respectively.

Preferably, when both the first direction is estimated when the voice has been detected during a time interval and the average direction is computed during a time interval, the predetermined minimum sound time is equal to the predetermined minimum averaging time and the predetermined maximum sound time is equal to the predetermined maximum averaging time. By using the same minimum values and the same maximum values, the processing carried out by the computing apparatus is simplified.

In some embodiments, the method further comprises repeating the digital steps with the computing apparatus one or more times for at least one of: starting, pausing, resuming, and stopping the digital tracking of the motion of the user.

The method is repeated one or a plurality of times so that the user is able to control the motion tracking system during a complete session of physical exercising. In this way, not only the user starts the motion tracking procedure so that the physical movements she/he performs are evaluated by the computing apparatus for rehabilitation purposes, but also during the motion tracking procedure the evolution thereof can be adjusted by the user without requiring user input means. Accordingly, the first and second directions are digitally estimated and the average direction is digitally computed whenever voice is detected upon digitally processing the detected sound waves, thus this process can be repeated a number of times. The computing apparatus then determines how to operate the motion tracking system based on the resulting computed difference(s) and, preferably, the voice commands determined from the detected voice.

In some embodiments, the method further comprises digitally storing each computed average direction; and starting to digitally track motion of the user further comprises:
  pausing, with the computing apparatus, the digital tracking of the motion of the user when a difference between two consecutive stored average directions exceeds a predetermined maximum average direction threshold; and subsequent to the pausing, resuming, with the computing apparatus, the digital tracking of the motion of the user when the voice of the user is subsequently detected and a computed difference between a subsequent first direction and a subsequent average direction does not exceed the predetermined difference threshold.

While the user is physically exercising, it may occur that she/he moves relative to the computing apparatus such that the second directions substantially change (typically when the user moves laterally with respect to the computing apparatus). This change is reflected in the difference between the consecutive stored average directions.

The computing apparatus may be configured to pause the motion tracking procedure and the evaluation of the physical exercise of the user upon detecting that said difference has become greater than the predetermined maximum average direction threshold. The pausing is a precautionary action taken by the computing apparatus in case the user is experiencing some difficulties while exercising, or in case the user decided to take off the sensors from her/his body without having stopped the motion tracking. If the user desires to continue with the motion tracking, she/he is to speak again, preferably she/he is to say a voice command associated with resumption of the motion tracking; to this end, the computing apparatus preferably informs the user that the motion tracking has been paused and that voice activity is necessary for resumption. The computing apparatus checks once again whether said voice and, optionally, the voice command comes from a same or similar direction than the electromagnetic waves radiated by the sensors, and upon determining that the subsequent difference is less than or equal to the predetermined difference threshold, the motion tracking is resumed.

In some embodiments, the method further comprises digitally processing, with the computing apparatus, both the detected sound waves and the captured electromagnetic waves so as to apply beamforming for reducing destructive interference of detected sound waves and/or captured electromagnetic waves.

By using beamforming techniques known in the art, there is a lower interference thanks to partial or complete cancelation of noise from other sound and/or electromagnetic sources. In turn, the detection of voice can be improved, thereby improving the estimation of the first direction and, also, the response of the computing apparatus to the speech of the user and her/his voice commands (if any). Additionally or alternatively, the reception of data packets can be improved, thereby improving the estimation of the second directions and, also, the bit error rate of the data packets received.

In some embodiments, each sensor of the plurality of sensors is configured to wirelessly transmit data packets within a 2.40 GHz to 2.50 GHz frequency range, and each antenna of the computing apparatus is adapted to capture electromagnetic waves within a 2.40 to 2.50 GHz frequency range.

The sensors and the computing apparatus are adapted to communicate via Bluetooth communications standard, which use the aforementioned frequency range. Preferably, the sensors and the computing apparatus communicate using Bluetooth Low Energy version 5.1 or latter for both lower battery consumption and direction of arrival processing.

In some embodiments, the computing apparatus is adapted to wirelessly receive data packets by means of a wireless communications standard capable of performing direction of arrival processing.

Some wireless communications standard such as Bluetooth Low Energy (at least from version 5.1 onwards) have implemented direction of arrival processing. The computing apparatus may estimate the second directions by way of this capability of the wireless communications standard used.

In some embodiments, each microphone of the plurality of microphones has a directive polar pattern.

Microphones with directive polar patterns may enhance the control of the motion tracking system by the user because the detection of sound waves is maximized for a region relative to the computing apparatus. Preferably, the region is in front of the computing apparatus and, more preferably, in front of a screen of the computing apparatus, since that region is where the user is usually located when doing physical exercise so that she/he may see the computing apparatus and the screen thereof for guidance on how to perform each movement of the physical exercise and get feedback on how she/he is actually performing the movements. By way of example, the polar pattern of the microphones is e.g. subcardioid, cardioid, supercardioid, hypercardioid, shotgun, etc.

In some embodiments, the computing apparatus starts to digitally track motion of the user and/or digitally changes the operation of the motion tracking system when or further when no computed differences between the first direction and the second directions of each sensor exceeds the predetermined difference threshold.

Even if the difference between the first direction and the average direction does not exceed the predetermined difference threshold, the computing apparatus may not start the digital motion tracking and/or change the operation of the system whenever the difference(s) between a direction estimated for one or more sensors (i.e. the second directions) and the first direction exceeds said predetermined threshold. This is because, in some occasions, the sensors may be located, relative to the computing apparatus, such that the average direction results in a computed difference not exceeding the predetermined difference threshold, yet one or more sensors are not close to the user or, even less preferably, are not arranged on the body thereof. The computing apparatus thus starts the motion tracking and/or changes the operation when no computed differences between the first direction and the second directions of the sensors exceed the predetermined difference threshold.

In some embodiments, the computing apparatus does not start to digitally track motion of the user and/or digitally provides or commands the provision of the at least one perceptible signal when one or more computed differences between the first direction and the second direction of a respective sensor exceeds the predetermined difference threshold.

In some embodiments, the method further comprises: detecting the sound waves with each microphone of the plurality of microphones and providing the detected sound waves to the computing apparatus; and capturing the electromagnetic waves with each antenna of the plurality of antennas.

A second aspect of the invention relates to a motion tracking system, comprising:
 a plurality of sensors adapted for arrangement on a body of a user and configured to wirelessly transmit data packets, each data packet including one or more measurements of a respective sensor; and
 a computing apparatus comprising:
  a plurality of antennas;

a plurality of microphones;
at least one memory; and
at least one processor configured to perform a method according to the first aspect of the invention.

The motion tracking system can be controlled, namely operated, by the user thereof without having to use user input means, even if the motion tracking system is provided with such means anyway. The user is, thus, able to control the motion tracking procedure by means of voice, for example she/he may trigger the start of the motion tracking, change the physical exercise to be done by her/him, pause the physical exercising routine, resume it, calibrate the sensors again, etc.

The computing apparatus not only uses the voice for changing the operation of the motion tracking system but also for determining whether it is the user of the motion tracking system who is attempting to control the motion tracking system.

The at least one processor is configured to process detected sound waves and captured electromagnetic waves as described with reference to the first aspect of the invention and, based on the directions estimated therefrom, change the operation of the motion tracking system.

A third aspect of the invention relates to a computer program product that has instructions which, when executed by a computing apparatus, cause the computing apparatus to perform a method according to the first aspect of the invention. Preferably, the computing apparatus is a computing apparatus of a motion tracking system comprising a plurality of sensors adapted to be arranged on a body of a user, and the computing apparatus comprises both a plurality of microphones and a plurality of antennas.

In some embodiments, the computer program product is embodied on a non-transitory computer readable medium.

A fourth aspect of the invention relates to a data stream which is representative of a computer program product according to the third aspect of the invention.

Similar advantages as those described for the first aspect of the invention are also applicable to the second, third and fourth aspects of the invention.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the invention can be carried out. The drawings comprise the following figures.

DESCRIPTION OF WAYS OF CARRYING OUT THE INVENTION

Figure 1:
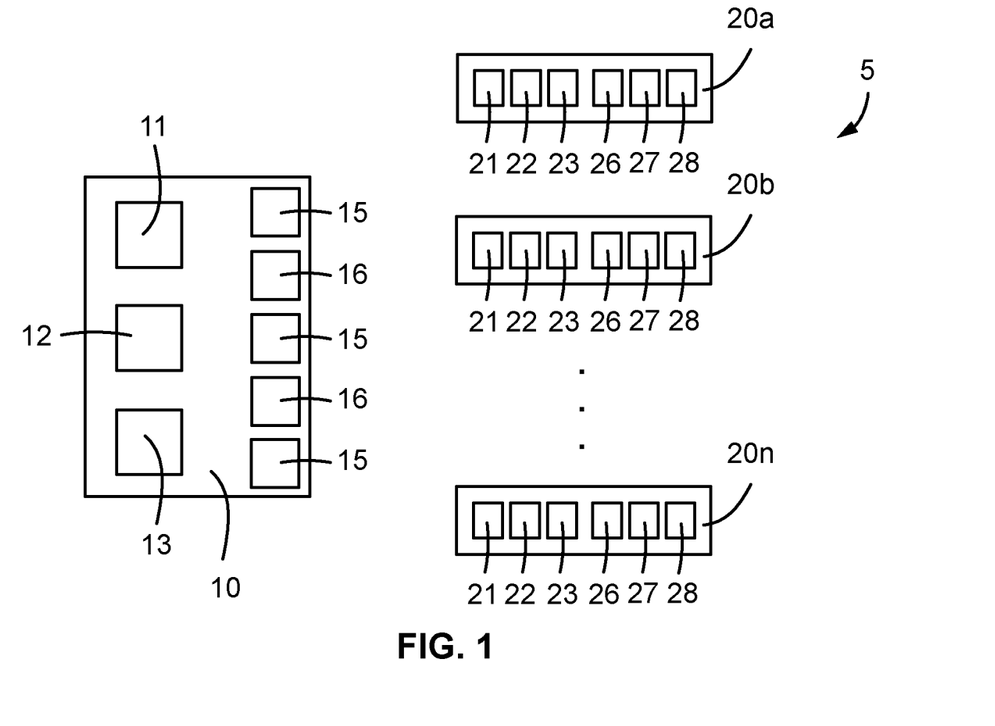
FIG. 1 diagrammatically shows a motion tracking system in accordance with an embodiment.

FIG. 1 diagrammatically shows a motion tracking system 5 in accordance with an embodiment. The motion tracking system 5 includes a plurality of sensors 20a-20n (e.g. two sensors, three sensors, four or even more sensors) and a computing apparatus 10, which may be e.g. a tablet, a mobile phone, a personal computer, etc.

Each sensor 20a-20n is adapted to be arranged on the body of a user so that the measurements provided by each sensor 20a-20n can be processed by the computing apparatus 10, thereby providing a motion sequence of the user. Each sensor 20a-20n is an inertial measurement unit that includes one or more sensing devices selected from: an accelerometer 21, a gyroscope 22 and a magnetometer 23. In the embodiment of FIG. 1, each sensor 20a-20n includes all three sensing devices 21-23. Preferably, all sensors 20a-20n include the same sensing devices 21-23.

The sensors 20a-20n further include at least one processor 26, at least one memory 27, and a first communications module 28 for transmitting data that enables the sensors to transmit measurements of the sensing device(s) 21-23 to the computing apparatus 10 through a wireless communications link (using a technology and protocol known by a skilled person, for instance but without limitation, Bluetooth and Bluetooth Low Energy communications, cellular network communications such as GSM, UMTS or LTE, wireless LAN communications, etc.). An antenna for radiating electromagnetic waves is provided as part of the first communications module 28. The same first communications modules 28, preferably, also enables the sensors 20a-20n to receive data from the computing apparatus 10 upon capturing electromagnetic waves with the antenna.

In some preferred embodiments, the at least one processor 26 of the sensors 20a-20n runs a sensor fusion algorithm for processing the measurements of the sensing devices 21-23 within the respective sensor. The sensor fusion algorithm is intended to enhance the raw measurements of the sensing devices by correcting errors thereof due to drifts of the sensing devices and, thus, outputs processed measurements that are to be transmitted to the computing apparatus 10.

The computing apparatus 10 includes at least one processor 11, at least one memory 12, and a second communications module 14 for at least receiving data. The computing apparatus 10 preferably also includes a screen 13 on which it shows the movements that are to be performed by an intended user of the motion tracking system 5 and feedback on the movements performed by the intended user during the motion tracking procedure. To this end, the computing apparatus 10 stores data relative to the physical exercises of intended users in the at least one memory 12. Any of these data can be transmitted to and/or received from another electronic device thanks to the second communications module 14. For example, a therapist is able to receive the feedback at a computing apparatus in a hospital so as to monitor the evolution of the person. Based on the feedback received, the therapist is able to adjust the difficulty of the movement(s), the number of repetitions thereof, prescribe new movements, etc. so that the person may further exercise using the motion tracking system 5. Further, in addition to the screen 13, which provides visual feedback, the computing apparatus 10 may also include further visual output means (e.g. LEDs, animations), audio output means (e.g.

loudspeakers), vibrating means (e.g. a vibrator), etc. for providing user perceptible signals in the form of sounds, vibration, animated graphics, etc.

The computing apparatus 10 includes a plurality of antennas 15 whereby electromagnetic waves may be captured, and then processed with the second communications module 14 and the at least one processor 11. In the embodiment of FIG. 1, the plurality of antennas 15 includes three antennas, but in other embodiments the computing apparatus 10 is provided with two antennas, or four antennas, or even more than four antennas.

Further, the computing apparatus 10 includes a plurality of microphones 16 whereby sound waves (i.e. pressure waves) may be detected, and then processed with the at least one processor 11. As it is readily apparent, the computing apparatus 10 includes analog-to-digital converters for digitizing detected sound waves and captured electromagnetic waves so that the streams of data may be processed by the at least one processor 11 and the second communications module 14. In the embodiment of FIG. 1, the plurality of microphones 16 includes two microphones, but in other embodiments the computing apparatus 10 is provided with three microphones, or even more than three microphones.

The distance(s) between the antennas 15 or the positions thereof in the computing apparatus 10 is/are stored in the at least one memory 12 so that the computing apparatus 10 is capable of estimating a direction of a user based on electromagnetic waves captured. And the distance(s) between the microphones 16 or the positions thereof in the computing apparatus 10 is/are also stored in the memory 12 for the estimation of a direction of a user based on sound waves detected.

Figure 2:
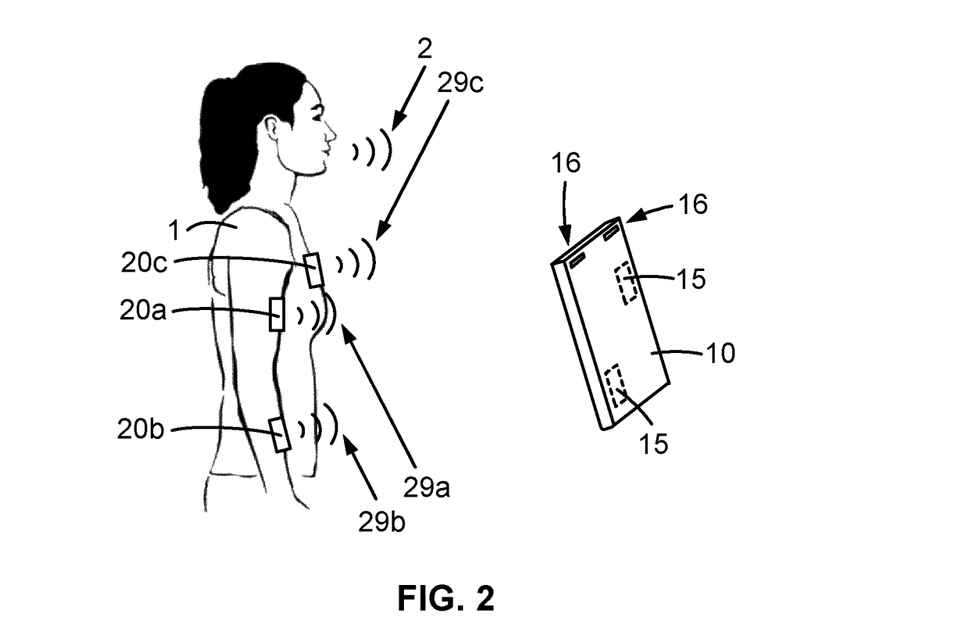
FIG. 2 shows a motion tracking system with sensors thereof arranged on a person.

FIG. 2 shows a motion tracking system with sensors 20a-20c thereof arranged on a person that is the user 1 of the system.

The user 1 has a first sensor 20a attached to the right upper arm, a second sensor 20b attached to the right lower arm, and a third sensor attached to the chest. The sensors 20a-20c may be attached to the body of the user 1 in a number of ways, for instance using straps, Velcro, etc.

At a distance from the user 1 is a computing apparatus 10 of the motion tracking system. The computing apparatus 10 includes two microphones 16 and two antennas 15 (shown with dashed contours for illustrative purposes since the antennas are typically within the housing of the computing apparatus 10).

Each of the sensors 20a-20c radiates electromagnetic waves 29a-29c whenever they are transmitting data packets in which they include measurements of the sensing devices. The user 1 speaks and, thus, emits sound waves 2, for controlling the motion tracking system, thereby being able to operate the system without having to touch the computing apparatus 10. This is of great convenience because the user 1 is typically at a distance from the computing apparatus 10, e.g. one meter, two meters, five meters away, etc. whenever she/he is physically exercising. The plurality of microphones 16 is capable of picking up the sound waves 2, whereas the plurality of antennas 15 is capable of picking up the electromagnetic waves 29a-29c.

Figure 3A:
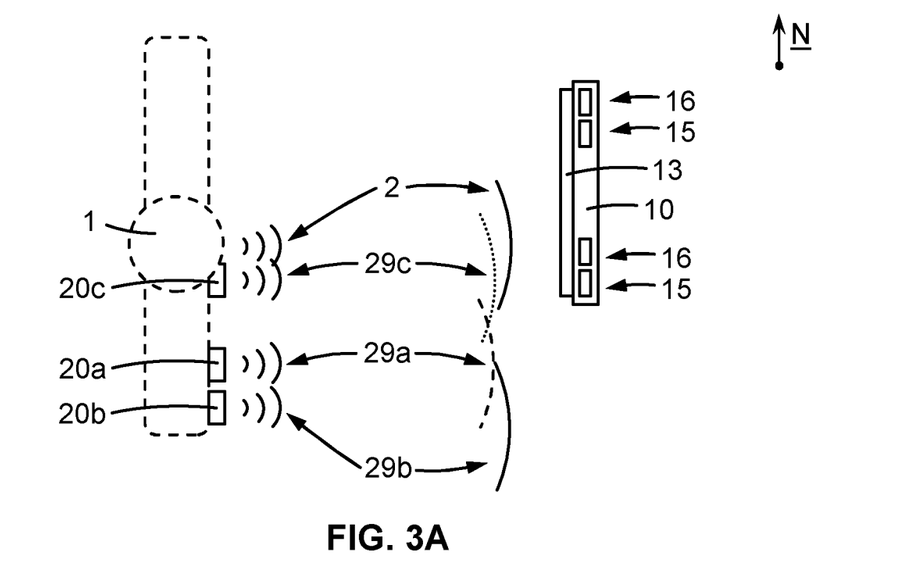
FIGS. 3A and 3B diagrammatically show, from a top view, direction estimation by a computing apparatus based on detected sound waves and captured electromagnetic waves.
Figure 3B:
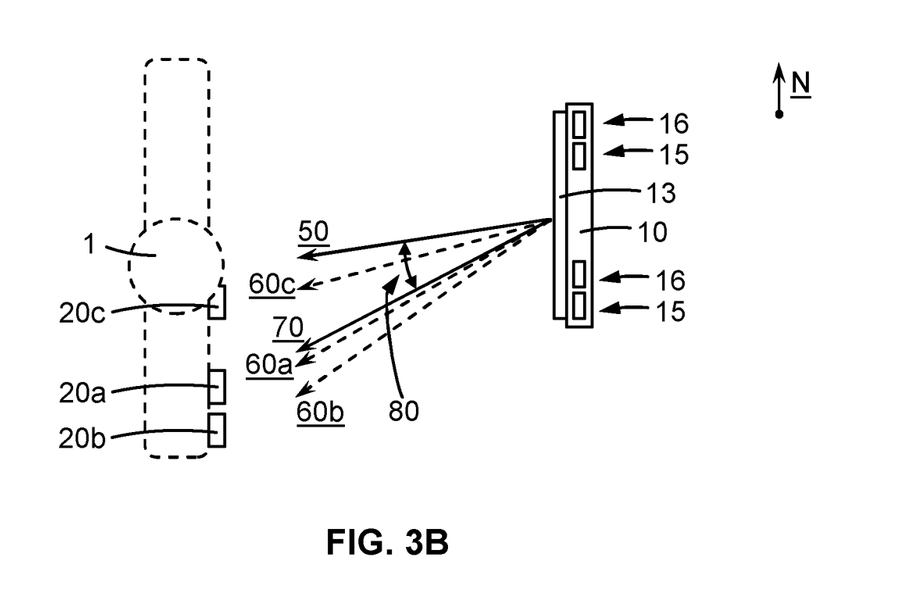

FIGS. 3A and 3B diagrammatically show, from a top view, direction estimation by a computing apparatus 10 based on detected sound waves 2 and captured electromagnetic waves 29a-29c. For clarity reasons only, an arrow N pointing at the north direction is illustrated.

In FIG. 3A are represented electromagnetic waves 29a-29c radiated by respective sensors 20a-20c, and sound waves 2 emitted by a user 1 of the motion tracking system. For easing understanding of the representation, at a distance from the user 1 is represented part of the sound wave 2 (illustrated with a solid line) as propagated, part of the electromagnetic wave 29a (illustrated with a dashed line) of a first sensor 20a as propagated, part of the electromagnetic wave 29b (illustrated with a solid line) of a second sensor 20b as propagated, and part of the electromagnetic wave 29c (illustrated with a dotted line) of a third sensor 20a as propagated.

When the sound waves 2 arrive at the microphones 16 and the electromagnetic waves 29a-29c arrive at the antennas 15, they are detected or captured. As illustrated in FIG. 3B (where the waves 2, 29a-29c are not illustrated again for clarity reasons only), the computing apparatus 10 processes the detected sound waves 2 so as detect a voice therein, in which case it estimates the direction of arrival (relative to the computing apparatus 10) of the sound waves 2 corresponding to the voice, namely the computing apparatus 10 computes a first direction 50 (shown with a solid arrow) for the sound waves 2 based on the same. The computing apparatus 10 also processes the captured electromagnetic waves 29a-29c and also computes a second direction 60a-60c (shown with a dashed arrow) for each sensor 20a-20c based on the electromagnetic waves 29a-29c. The first and second directions 50, 60a-60c may be computed by phase differencing the waves 2, 29a-29c, for instance.

The computing apparatus 10 then computes an average direction 70 (shown with a solid arrow) for the second directions 60a-60c, namely the second directions 60a-60c are averaged so as to provide the average direction 70. A difference 80 between said average direction 70 and the first direction 50 is computed with the computing apparatus 10 so as to establish whether the person who emitted the sound waves 2 is the user 1 of the motion tracking system. In this sense, the computing apparatus 10 determines that said person is the user 1 when the difference 80 is less than or equal to a predetermined difference threshold.

The user 1 may thus control the motion tracking system and, for instance, say voice commands that are retrieved and processed by the computing apparatus 10 from the detected voice. The user 1 may also trigger the start of the digital motion tracking with the computing apparatus 10 whereby the computing apparatus 10 processes the measurements within data packets transmitted in the electromagnetic waves radiated by the sensors 20a-20c, provides the motion sequence based on those measurements, and evaluates the motion sequence of the user 1 so as to determine whether the user 1 is performing predetermined movements correctly. The predetermined movements are typically prescribed by a therapist or a trainer, and are presented to the user 1 by means of the screen 13.

In this example, each of the directions 50, 60a-60c, 70 corresponds to an angle defined in a horizontal plane (i.e. the plane of the sheet) and which contains at least part of the computing apparatus 10 (and, in this example, it also contains the arrow N).

Figure 4:
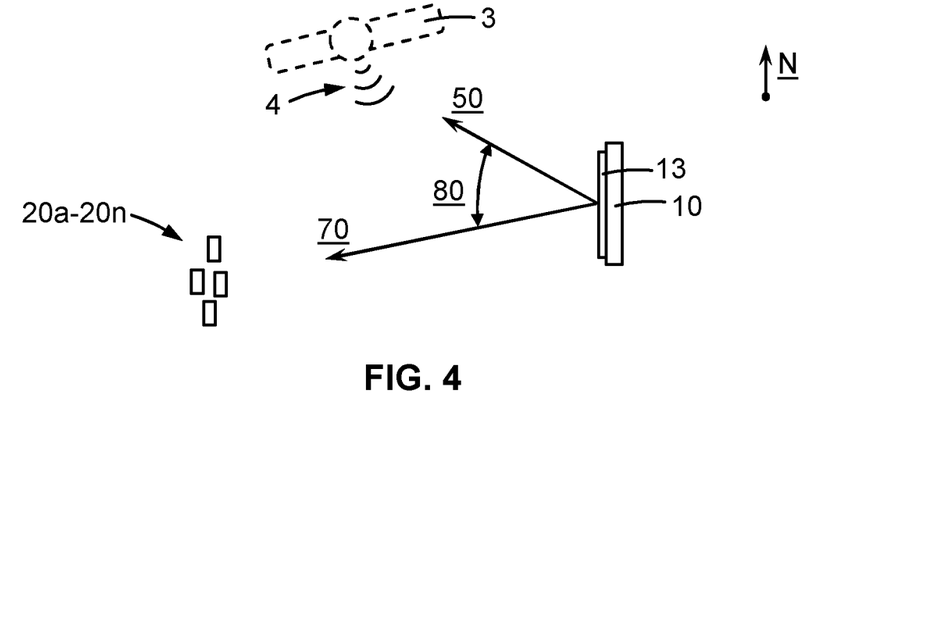
FIG. 4 diagrammatically shows, from a top view, a person attempting to control a motion tracking system unsuccessfully.

FIG. 4 diagrammatically shows, from a top view, a person 3 attempting to control a motion tracking system unsuccessfully.

As described with reference to FIGS. 3A-3B, the computing apparatus 10 detects a voice in the sound waves 4 of a person 3 that is attempting to control the motion tracking system. The computing apparatus 10 estimates the first direction 50 for that voice based on the sound waves 4, and the second directions (not illustrated) for the electromagnetic waves of the sensors 20a-20n. Then, the computing apparatus 10 computes both the average direction 70 for the second directions, and the difference 80.

Since the difference 80 exceeds a predetermined difference threshold, the computing apparatus 10 determines that the person 3 is not the user of the motion tracking system, therefore the person 3 cannot control the motion tracking system with her/his voice.

Figure 5:
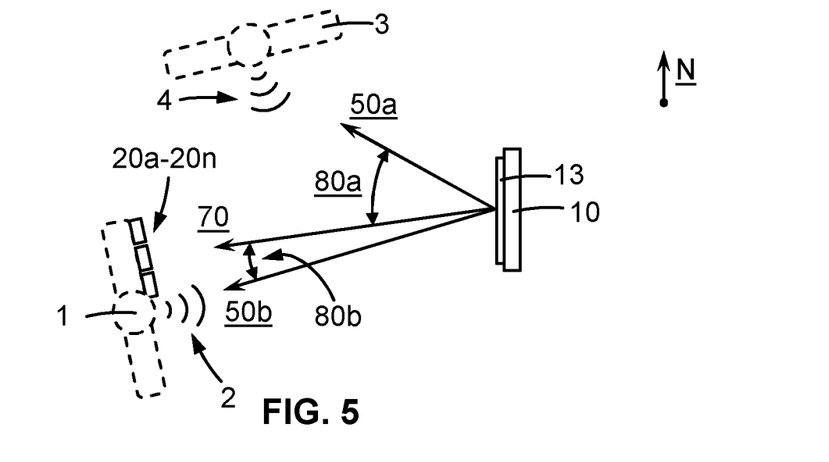
FIG. 5 diagrammatically shows, from a top view, a computing apparatus determining who is the user of a motion tracking system that is able to control it.

FIG. 5 diagrammatically shows, from a top view, a computing apparatus determining who is the user of a motion tracking system that is able to control it.

In this case, first and second persons 1, 3 are speaking, and the computing apparatus 10 estimates a first direction 50a, 50b for each of them. The first person 1 is wearing the sensors 20a-20n whereas the second person 2 is not. The computing apparatus computes first and second differences 80a, 80b between respective first directions 50a, 50b and the average direction 70 computed for the sensors 20a-20n. Based on these differences 80a, 80b, the computing apparatus 10 determines that the first person 1 is a user 1 of the motion tracking system since the difference 80b corresponding to that person 1 does not exceed a predetermined difference threshold, whereas the difference 80a corresponding to the second person 3 exceeds the predetermined difference threshold.

When neither difference 80a, 80b exceeds the predetermined difference threshold, the computing apparatus 10 may determine that the person whose computed difference 80a, 80b is lower is the user 1 of the motion tracking system. Hence, said user 1 is the one able to control the motion tracking system and, in particular, the motion tracking procedure.

Notwithstanding, in some embodiments, when the computing apparatus 10 determines that a person is the user 1 of the motion tracking system owing to the computed difference not exceeding the predetermined difference threshold as in the scenarios of FIGS. 3A-3B, and 5, the computing apparatus 10 may store (in a memory thereof) the detected voice of the user 1 as a voice sample and use it later on as additional means for determining whether a detected voice corresponds to the user of the motion tracking system. To this end, the computing apparatus 10 applies digital voice recognition techniques known in the art to voice detected in sound waves based on voice samples that are stored in the computing apparatus. This, for instance, is useful for determining that a person 3 speaking while near the sensors 20a-20c is not a user of the motion tracking system, hence the computing apparatus disregards any attempts to control the motion tracking system coming from said person.

Said voice recognition is also useful for determining, with the computing apparatus 10, who is the user of the motion tracking system when both the user 1 and the person 3 (and, possibly, other people too) are speaking at the same time and the computed differences 80a, 80b corresponding to both are lower than the predetermined difference threshold; it may even occur that the computed difference 80a corresponding to the person 3 is lower than the computed difference 80b corresponding to the user 1. The computing apparatus 10 performs voice recognition to disambiguate between all the voices and identify the user of the motion tracking system if she/he is speaking. In this way, the computing apparatus 10 only considers attempts to control the motion tracking system by the identified user and disregards any other attempts coming from other people.

Figure 6:
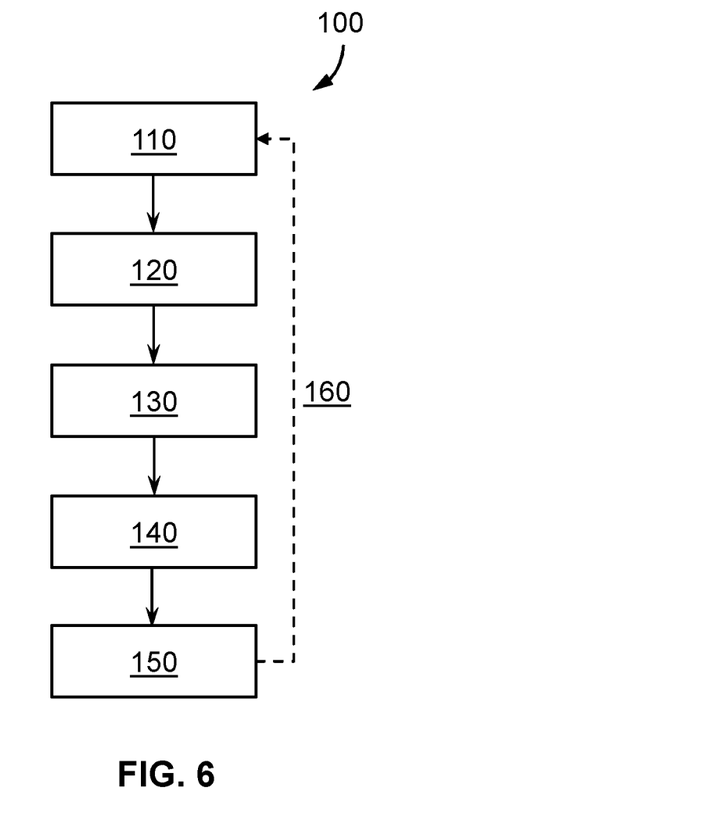
FIG. 6 diagrammatically shows a method in accordance with an embodiment.

FIG. 6 diagrammatically shows a method 100 for controlling a motion tracking system (for example, the motion tracking system 5 of FIG. 1) in accordance with an embodiment.

The method 100 comprises a step 110 whereby a computing apparatus (for example, the computing apparatus 10 of any one of FIGS. 1-5) of the motion tracking system processes sound waves detected by each microphone. The computing apparatus detects a voice present in the processed sound waves and estimates a first direction of a user relative to the computing apparatus by computing a direction of arrival of the detected sound waves corresponding to said voice.

Preferably, the computing apparatus estimates the first direction when the voice has been detected during a time interval that spans between a predetermined minimum sound time and a predetermined maximum sound time.

In some cases, in step 110, the computing apparatus determines whether the voice present in the processed sound waves belongs to a predetermined user by applying a voice recognition technique to it based on a voice sample of the predetermined user, said voice sample being stored in the computing apparatus. Upon determining that the voice belongs to the predetermined user, the computing apparatus estimates the first direction.

It may also occur that there are two or more voices present in the processed sound waves. In such situation, the computing apparatus may apply a voice recognition technique to each such voice in order to determine if any voice belongs to a predetermined user; to this end, the voice recognition technique attempts to recognize any voice based on one or more voice samples of one or more predetermined users that is/are stored in the computing apparatus. Upon determining that one of the voices belongs to a predetermined user, the computing apparatus estimates the first direction for that particular voice based on the detected sound waves for that particular voice.

The method 100 further comprises a step 120 whereby the computing apparatus processes electromagnetic waves captured by each antenna. The computing apparatus detects data packets transmitted by sensors of the motion tracking system that are present in the processed electromagnetic waves, and estimates second directions of each sensor relative to the computing apparatus by computing a direction of arrival of the captured electromagnetic waves.

The step 120 corresponding to the estimation of the second directions may take place prior to the step 110 corresponding to the estimation of the first direction, or after said step 110, or even both steps 110, 120 may be carried out in parallel.

The method 100 further comprises a step 130 whereby the computing apparatus averages the second directions computed in step 120 so as to provide an average direction.

The method 100 further comprises a step 140 whereby the computing apparatus computes a difference between the average direction computed in step 130 and the first direction computed in step 110.

The method 100 further comprises a step 150 whereby the computing apparatus starts a digital motion tracking procedure by processing measurements of the sensors and providing a motion sequence of the user of the motion tracking system. The computing apparatus starts to digitally track the motion of the user when the difference computed in step 140 does not exceed a predetermined difference threshold. Preferably, the computing apparatus starts said digital motion tracking when the user has pronounced a voice command associated with such task.

In preferred embodiments, the method 100 further comprises a step 160 whereby the computing apparatus repeats the described process so that the user of the motion tracking system may control the operation thereof continuously, for example during an entire physical exercising session of a user.

Also, in preferred embodiments, the method 100 further comprises a step whereby the computing apparatus digitally changes the operation of the motion tracking system based on a voice command of the user. This change of the operation is made by the computing apparatus when the difference computed in step 140 does not exceed the predetermined difference threshold.

In this text, the terms first, second, third, etc. have been used herein to describe several devices, elements or parameters, it will be understood that the devices, elements or parameters should not be limited by these terms since the terms are only used to distinguish one device, element or parameter from another. For example, the first direction could as well be named second direction, and the second direction could be named first direction without departing from the scope of this disclosure.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A method for controlling a motion tracking system, the motion tracking system comprising a plurality of sensors adapted for arrangement on a body of a user and configured to wirelessly transmit data packets, and a computing apparatus comprising both a plurality of antennas and a plurality of microphones, the method including the following steps:
    processing, with the computing apparatus, sound waves detected by each microphone of the plurality of microphones so as to detect a voice of the user and estimate a first direction of the user relative to the computing apparatus based on the detected sound waves;
    processing, with the computing apparatus, electromagnetic waves captured by each antenna of the plurality of antennas so as to detect data packets transmitted to the computing apparatus by each sensor of the plurality of sensors and estimate second directions of each sensor of the plurality of sensors relative to the computing apparatus based on the captured electromagnetic waves, each of the data packets including one or more measurements of a respective sensor of the plurality of sensors;
    averaging the second directions with the computing apparatus so as to provide an average direction for the plurality of sensors;
    computing a difference between the first direction and the average direction with the computing apparatus; and
    starting, with the computing apparatus, to track motion of the user based on measurements of each sensor of the plurality of sensors in the data packets when the computed difference does not exceed a predetermined difference threshold.

2. The method of claim 1, wherein starting to track motion of the user is carried out when both the computed difference does not exceed the predetermined difference threshold and the computing apparatus determines that the detected voice comprises a voice command for tracking motion of the user.

3. The method of claim 1, wherein upon detecting the voice of the user by processing the detected sound waves, the computing apparatus determines whether the detected voice or one voice detected therefrom belongs to a predetermined user by comparing the detected voice with a voice sample of the predetermined user stored in the computing apparatus, and:
    the first direction is estimated when the computing apparatus has determined that the detected voice belongs to the predetermined user; or
    the first direction is an estimation of the direction of the user of the one voice detected, relative to the computing apparatus, when the computing apparatus has determined that the one voice detected belongs to the predetermined user.

4. The method of claim 1, wherein at least one of the following:
    the first direction is estimated by phase differencing the sound waves detected by each microphone of the plurality of microphones or by measuring time difference of arrival of the sound waves detected by each microphone of the plurality of microphones; and
    the second directions are estimated by phase differencing the electromagnetic waves captured by each antenna of the plurality of antennas of the computing apparatus or by measuring time difference of arrival of the electromagnetic waves captured by each antenna of the plurality of antennas of the computing apparatus.

5. The method of claim 1, further comprising:
    not starting, with the computing apparatus, to process measurements of each sensor of the plurality of sensors in the data packets so as not to track motion of the user when the computed difference exceeds the predetermined difference threshold.

6. The method of claim 1, further comprising providing or commanding provision of at least one perceptible signal when the computed difference exceeds the predetermined difference threshold, the at least one perceptible signal being indicative of at least one of:
    detection of not all sensors of the plurality of sensors being arranged on the body of the user; and
    indication that all the sensors of the plurality of sensors must be arranged on the body of the user.

7. The method of claim 1, further comprising changing operation of the motion tracking system with the computing apparatus when both the computed difference does not exceed the predetermined difference threshold and the computing apparatus determines that the detected voice comprises a voice command for changing the operation.

8. The method of claim 1, wherein the average direction is computed during a time interval that spans between a predetermined minimum averaging time and a predetermined maximum averaging time.

9. The method of claim 1, wherein the first direction is estimated when the voice has been detected during a time interval that spans between a predetermined minimum sound time and a predetermined maximum sound time.

10. The method of claim 1, further comprising repeating the steps with the computing apparatus one or more times for at least one of: pausing, resuming, and stopping the tracking of the motion of the user.

11. The method of claim 1, wherein the computing apparatus is adapted to wirelessly receive data packets by means of a wireless communications standard capable of performing direction of arrival processing.

12. A motion tracking system comprising:
a plurality of sensors adapted for arrangement on a body of a user and configured to wirelessly transmit data packets, each of the data packets including one or more measurements of a respective sensor of the plurality of sensors; and
a computing apparatus comprising:
  a plurality of antennas;
  a plurality of microphones;
  at least one memory; and
  at least one processor configured to:
    process sound waves detected by each microphone of the plurality of microphones so as to detect a voice of the user and estimate a first direction of the user relative to the computing apparatus based on the detected sound waves;
    process electromagnetic waves captured by each antenna of the plurality of antennas so as to detect data packets transmitted to the computing apparatus by each sensor of the plurality of sensors and estimate second directions of each sensor of the plurality of sensors relative to the computing apparatus based on the captured electromagnetic waves, each of the data packets including one or more measurements of a respective sensor of the plurality of sensors;
    average the second directions to provide an average direction for the plurality of sensors;
    compute a difference between the first direction and the average direction; and
    start to track motion of the user based on measurements of each sensor of the plurality of sensors in the data packets when the computed difference does not exceed a predetermined difference threshold.

13. The motion tracking system of claim 12, wherein the at least one processor is configured start to track motion of the user when both the computed difference does not exceed the predetermined difference threshold and the at least one processor determines that the detected voice comprises a voice command for tracking motion of the user.

14. The motion tracking system of claim 12, wherein the at least one processor is configured to, upon detecting the voice of the user by processing the detected sound waves, determine whether the detected voice or one voice detected therefrom belongs to a predetermined user by comparing the detected voice with a voice sample of the predetermined user stored in the at least one memory, and wherein:
  the first direction is estimated when the at least one processor has determined that the detected voice belongs to the predetermined user; or
  the first direction is an estimation of the direction of the user of the one voice detected, relative to the computing apparatus, when the at least one processor has determined that the one voice detected belongs to the predetermined user.

15. The motion tracking system of claim 12, wherein the at least one processor is configured to at least one of the following:
  estimate the first direction by phase differencing the sound waves detected by each microphone of the plurality of microphones or by measuring time difference of arrival of the sound waves detected by each microphone of the plurality of microphones; and
  estimate the second directions by phase differencing the electromagnetic waves captured by each antenna of the plurality of antennas or by measuring time difference of arrival of the electromagnetic waves captured by each antenna of the plurality of antennas.

16. The motion tracking system of claim 12, wherein the at least one processor is further configured to not start to process measurements of each sensor of the plurality of sensors in the data packets so as not to track motion of the user when the computed difference exceeds the predetermined difference threshold.

17. The motion tracking system of claim 12, wherein the at least one processor is further configured to provide or command provision of at least one perceptible signal when the computed difference exceeds the predetermined difference threshold, the at least one perceptible signal being indicative of at least one of the following:
  detection of not all sensors of the plurality of sensors being arranged on the body of the user; and
  indication that all the sensors of the plurality of sensors must be arranged on the body of the user.

18. The motion tracking system of claim 12, wherein the at least one processor is further configured to change operation of the motion tracking system when both the computed difference does not exceed the predetermined difference threshold and the at least one processor determines that the detected voice comprises a voice command for changing the operation.

19. The motion tracking system of claim 12, wherein the computing apparatus is adapted to wirelessly receive data packets by means of a wireless communications standard capable of performing direction of arrival processing.

20. A non-transitory computer-readable storage medium comprising instructions which, when executed by a device, cause the device to at least carry out the following:
  process sound waves detected by each microphone of a plurality of microphones of the device so as to detect a voice of a user and estimate a first direction of the user relative to the device based on the detected sound waves;
  process electromagnetic waves captured by each antenna of a plurality of antennas of the device so as to detect data packets transmitted to the device by each sensor of a plurality of sensors and estimate second directions of each sensor of the plurality of sensors relative to the device based on the captured electromagnetic waves, each of the data packets including one or more measurements of a respective sensor of the plurality of sensors;
  average the second directions so as to provide an average direction for the plurality of sensors;
  compute a difference between the first direction and the average direction; and
  start to track motion of the user based on measurements of each sensor of the plurality of sensors in the data packets when the computed difference does not exceed a predetermined difference threshold.

* * * * *